(12) United States Patent
Kepecs

(10) Patent No.: US 7,805,333 B2
(45) Date of Patent: Sep. 28, 2010

(54) TECHNIQUES FOR USING LOYALTY CARDS AND REDEEMING ACCUMULATED VALUE

(75) Inventor: Jonathan Kepecs, Woodside, CA (US)

(73) Assignee: DS-IQ, Inc., Bellevue, WA (US)

( * ) Notice: Subject to any disclaimer, the term of this patent is extended or adjusted under 35 U.S.C. 154(b) by 1594 days.

(21) Appl. No.: 10/778,611

(22) Filed: Feb. 12, 2004

(65) Prior Publication Data
US 2004/0230483 A1 Nov. 18, 2004

Related U.S. Application Data

(60) Provisional application No. 60/519,939, filed on Nov. 14, 2003, provisional application No. 60/513,383, filed on Oct. 21, 2003, provisional application No. 60/511,256, filed on Oct. 14, 2003, provisional application No. 60/447,574, filed on Feb. 14, 2003.

(51) Int. Cl.
G06Q 30/00 (2006.01)
(52) U.S. Cl. .............. 705/14.17; 705/14.36; 705/14.38
(58) Field of Classification Search .............. 705/14, 705/14.17, 14.36, 14.38
See application file for complete search history.

(56) References Cited

U.S. PATENT DOCUMENTS

| | | | |
|---|---|---|---|
| 4,554,446 A | 11/1985 | Murphy et al. | |
| 4,723,212 A | 2/1988 | Mindrum et al. | |
| 4,817,043 A | 3/1989 | Brown | |
| 4,825,045 A | 4/1989 | Humble | |
| 4,882,675 A | 11/1989 | Nichtberger et al. | |
| 4,896,791 A | 1/1990 | Smith | |
| 4,910,672 A | 3/1990 | Off et al. | |
| 4,941,090 A | 7/1990 | McCarthy | |
| 4,949,256 A | 8/1990 | Humble | |
| 4,982,346 A | 1/1991 | Girouard et al. | |
| 5,039,848 A | 8/1991 | Stoken | |
| 5,056,019 A | 10/1991 | Schultz et al. | |
| 5,117,355 A | 5/1992 | McCarthy | |
| 5,173,851 A | 12/1992 | Off et al. | |
| 5,185,695 A | 2/1993 | Pruchnicki | |
| 5,201,010 A | 4/1993 | Deaton et al. | |
| 5,231,568 A | 7/1993 | Cohen et al. | |

(Continued)

FOREIGN PATENT DOCUMENTS

AU 755875 4/2003

(Continued)

OTHER PUBLICATIONS

Thorp, Susan A., "Credit Card May Take Sting Out of Memory of a Tongue Licked by Trading Stamps", Memphis Business Journal (Memphis, Tenn., USA), V 9 N 43 sec. 1 p. 1, Mar. 21 1988.*

(Continued)

Primary Examiner—Donald L Champagne
(74) Attorney, Agent, or Firm—Aka Chan LLP

(57) ABSTRACT

Techniques for accumulating value and redeeming the accumulated value in a flexible manner. An accumulate ID is provided that may be used by consumers to accumulate value (e.g., cash, points, etc.) in an account associated with the accumulate ID. A redemption ID is provided that enables the value accumulated in the account, or a portion thereof, to be redeemed.

26 Claims, 5 Drawing Sheets

U.S. PATENT DOCUMENTS

| | | | |
|---|---|---|---|
| 5,305,195 | A | 4/1994 | Murphy |
| 5,373,440 | A | 12/1994 | Cohen et al. |
| 5,380,991 | A | 1/1995 | Valencia et al. |
| RE34,915 | E | 4/1995 | Nichtberger et al. |
| 5,420,606 | A | 5/1995 | Begum et al. |
| 5,430,644 | A | 7/1995 | Deaton et al. |
| 5,448,471 | A | 9/1995 | Deaton et al. |
| 5,459,306 | A | 10/1995 | Stein et al. |
| 5,467,269 | A | 11/1995 | Flaten |
| 5,612,868 | A | 3/1997 | Off et al. |
| 5,638,457 | A | 6/1997 | Deaton et al. |
| 5,659,165 | A * | 8/1997 | Jennings et al. ............. 235/379 |
| 5,687,322 | A | 11/1997 | Deaton et al. |
| 5,708,782 | A | 1/1998 | Larson et al. |
| 5,710,886 | A | 1/1998 | Christensen et al. |
| 5,710,887 | A | 1/1998 | Chelliah et al. |
| 5,717,866 | A | 2/1998 | Naftzger |
| 5,761,648 | A | 6/1998 | Golden et al. |
| 5,832,457 | A | 11/1998 | O'Brien et al. |
| 5,855,007 | A | 12/1998 | Jovicic et al. |
| 5,857,175 | A | 1/1999 | Day et al. |
| 5,903,874 | A | 5/1999 | Leonard et al. |
| 5,907,830 | A | 5/1999 | Engel et al. |
| 5,909,023 | A | 6/1999 | Ono et al. |
| 5,923,016 | A | 7/1999 | Fredregill et al. |
| 5,924,080 | A | 7/1999 | Johnson |
| 5,956,694 | A | 9/1999 | Powell |
| 5,970,124 | A | 10/1999 | Csaszar et al. |
| 5,970,469 | A | 10/1999 | Scroggie et al. |
| 5,970,470 | A | 10/1999 | Walker et al. |
| 5,974,399 | A | 10/1999 | Giuliani et al. |
| 6,009,411 | A | 12/1999 | Kepecs |
| 6,014,634 | A | 1/2000 | Scroggie et al. |
| 6,014,638 | A | 1/2000 | Burge et al. |
| 6,026,370 | A | 2/2000 | Jermyn |
| 6,029,139 | A | 2/2000 | Cunningham et al. |
| 6,039,244 | A | 3/2000 | Finsterwald |
| 6,044,362 | A | 3/2000 | Neely |
| 6,055,573 | A | 4/2000 | Gardenswartz et al. |
| 6,076,068 | A | 6/2000 | DeLapa et al. |
| 6,076,071 | A | 6/2000 | Freeny, Jr. |
| 6,115,693 | A | 9/2000 | McDonough et al. |
| 6,134,534 | A | 10/2000 | Walker et al. |
| 6,185,541 | B1 | 2/2001 | Scroggie et al. |
| 6,237,145 | B1 | 5/2001 | Narasimhan et al. |
| 6,330,543 | B1 | 12/2001 | Kepecs |
| 6,389,401 | B1 | 5/2002 | Kepecs |
| 6,507,823 | B1 * | 1/2003 | Nel ............................. 705/26 |
| 6,685,088 | B1 * | 2/2004 | Royer et al. ................ 235/380 |
| 2002/0065712 | A1 * | 5/2002 | Kawan ........................ 705/14 |
| 2003/0212599 | A1 | 11/2003 | Kepecs |
| 2004/0054587 | A1 * | 3/2004 | Dev et al. ..................... 705/14 |
| 2004/0107135 | A1 * | 6/2004 | Deatherage et al. .......... 705/14 |
| 2004/0200898 | A1 | 10/2004 | Kepecs |
| 2005/0060225 | A1 * | 3/2005 | Postrel ........................ 705/14 |

FOREIGN PATENT DOCUMENTS

| | | |
|---|---|---|
| EP | 1029302 | 8/2000 |
| EP | 1192573 | 4/2002 |
| JP | 407065242 A | 3/1995 |
| JP | 408161635 A | 6/1996 |
| WO | WO 85/01373 A1 | 3/1985 |
| WO | WO 92/14213 A1 | 8/1992 |
| WO | WO 92/20030 A1 | 11/1992 |
| WO | WO 93/16443 A1 | 8/1993 |
| WO | WO 94/09440 A1 | 4/1994 |
| WO | WO 99/12115 A1 | 3/1995 |
| WO | WO 95/21428 A1 | 8/1995 |
| WO | WO 97/23838 A1 | 7/1997 |
| WO | WO 97/30409 A2 | 8/1997 |
| WO | WO 98/38589 A1 | 3/1998 |
| WO | WO 99/26176 A1 | 5/1999 |
| WO | WO 00/41115 A1 | 7/2000 |
| WO | WO 00/67174 A1 | 11/2000 |
| WO | WO 01/46892 A1 | 6/2001 |
| ZA | 98/10678 | 10/1999 |

OTHER PUBLICATIONS

Beck, J., "3 Types of Systems Drive Coupon Programs," *Supermarket News*, 37:48 (1987).

Brown et al., "Are Profits Deserved?," *J. Bus. Ethics*, 11(2):105-114 (1992).

"Banyan Joins the Vultures Picking Over the 3+, 3+ Open Corpse," *Computergram International*, Nov. 5, 1992.

"World's First Smart Card Frequent Flyer Scheme Debuts," Newbyte News Network, Sep. 1997.

"Intellipost Launches BonusMail With 50,000 Charter Members," Byline: Business Editors/Computer Writers, Jun. 1997.

Kremer, J., "Mail Order Selling Made Easier," Ad-Lib Publications, pp. 75-79 (1983).

Taylor, S. "Don't Become Confined by The Box," *Advertising Age*, 68:26 (1997).

PR Newswire, "Caldor Announces Agreement with New York State Attorney General," Jan. 11, 1993.

\* cited by examiner

TECHNIQUES FOR USING LOYALTY CARDS AND REDEEMING ACCUMULATED VALUE

CROSS-REFERENCES TO RELATED APPLICATIONS

The present application claims priority from the following provisional applications, the entire contents of which are herein incorporated by reference for all purposes.

(1) U.S. Provisional Application No. 60/447,574 filed Feb. 14, 2003;

(2) U.S. Provisional Application No. 60/511,256 filed Oct. 14, 2003;

(3) U.S. Provisional Application No. 60/513,383 filed Oct. 21, 2003; and

U.S. Provisional Application No. 60/519,939 filed Nov. 14, 2003.

The present application also incorporates by reference for all purposes the entire contents of U.S. application Ser. No. 10/778,918 filed concurrently with the present application.

BACKGROUND OF THE INVENTION

The present invention relates to promotions and discounts offered to consumers, and more particularly to techniques for redeeming value accumulated by consumers based upon their shopping activities.

Loyalty programs are commonly used by retailers to improve consumer loyalty and to lure consumers away from their competitors. In a typical loyalty program, loyalty cards are issued to consumers. Loyalty cards reward consumers for frequenting and making purchases at stores covered by the loyalty cards. When a loyalty card is used, advertised promotions are given to the consumer in the form of discounts or points that are redeemed at the point of sale as a credit against a purchase made by the consumer.

With an increase in the number of retailers (both brick-and-mortar stores and online stores) offering loyalty programs, retailers are now constantly striving to offer "better" loyalty programs than their competitors in an effort to improve consumer loyalty and also to lure consumers away from their competitors. Accordingly, there is need for loyalty programs that are more flexible, easier to use by the consumers, and offer better benefits than existing loyalty programs. Retailers also would like to implement the "better" loyalty programs without incurring significant costs or making significant changes to their existing infrastructure.

BRIEF SUMMARY OF THE INVENTION

Embodiments of the present invention provide techniques for accumulating value and redeeming the accumulated value in a flexible manner. An accumulate ID is provided that may be used by consumers to accumulate value (e.g., cash, points, etc.) in an account associated with the accumulate ID. A redemption ID is provided that enables the value accumulated in the account, or a portion thereof, to be redeemed.

According to an embodiment of the present invention, techniques are provided for redeeming value accumulated in an account. Information identifying a first redemption identifier is received. A first accumulate identifier is determined corresponding to the first redemption identifier, the first accumulate identifier used for accumulating value in an account associated with the first accumulate identifier. A portion of the value accumulated in the account associated with the first accumulate identifier is redeemed.

According to another embodiment of the present invention, techniques are provided for enabling accumulation and redemption of value. In this embodiment, information is received identifying one or more purchases made by a consumer. A first identifier associated with the one or more purchases is received. A second identifier associated with the one or more purchases is received. The information identifying the one or more purchases, the first identifier, and the second identifier is stored in a transaction log. The transaction log is analyzed to determine information identifying the one or more purchases and the first identifier and the second identifier associated with the one or more purchases. Correlation information is stored correlating the first identifier and the second identifier.

According to yet another embodiment of the present invention, techniques are provided for enabling accumulation and redemption of value. Information identifying a single identifier is received. First information is received specifying a context of use of the single identifier. Based upon the first information, it is determined that a portion of value accumulated in an account associated with the single identifier is to be redeemed. The portion of value is redeemed from the account associated with the single identifier.

According to another embodiment of the present invention, techniques are provided for using a card. A single identifier is read from the card. First information is received specifying a context of use of the single identifier. A first operation is determined from a plurality of operations based upon the first information. Performance of the first operation is facilitated.

The foregoing, together with other features, embodiments, and advantages of the present invention, will become more apparent when referring to the following specification, claims, and accompanying drawings.

DETAILED DESCRIPTION OF THE INVENTION

Figure 1:
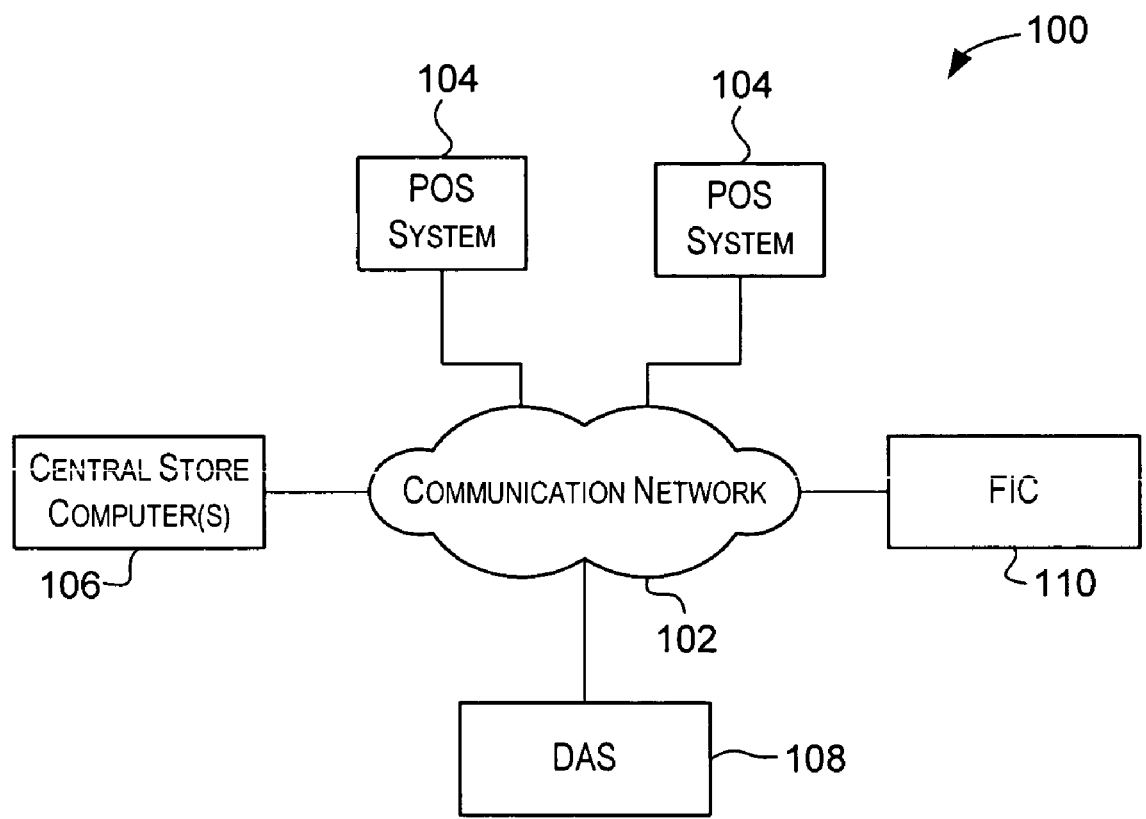
FIG. 1 is a simplified block diagram of a distributed network that may incorporate an embodiment of the present invention.

In the following description, for the purposes of explanation, specific details are set forth in order to provide a thorough understanding of the invention. However, it will be apparent that the invention may be practiced without these specific details.

The use of loyalty cards is quite common especially in the retail industry. Loyalty cards reward consumers for frequenting and making purchases at stores covered by the loyalty cards. When a loyalty card is used, advertised promotions are given to the consumer in the form of discounts or points that can be redeemed directly at the point of sale as a credit against a purchase.

A method and system for managing promotions tied to a KEY or unique identifier associated with the loyalty card that, in one embodiment, requires only limited direct identification of the consumer is described in U.S. Pat. No. 6,330,543 B1. Each consumer is assigned and identified by a KEY or a unique identifier ("unique ID"). In this manner, no direct consumer identification information such as the consumer's name, address, etc. is stored or used and anonymity of the consumer is preserved.

The KEY or unique ID acts as limited identification information as it does not convey any private or personal consumer information in and of itself. The retailer might collect and associate personal information such as name and address with the KEY for other purposes (such as for direct mail advertisements) but this association is not required for implementing a promotional system. Accordingly, a retailer may manufacture several loyalty cards with pre-assigned KEYs. These cards may be made available at the retail store locations or at other locations. A consumer can randomly select a card and start using it without providing any personal information such as name, telephone, number, etc. The cards may come in different shapes and forms. For example, each card may have a KEY printed on it. The KEY may also be printed on a label that is then affixed to a card. In other embodiments, the KEY may be in the form of a barcode that is either printed on or affixed to the card. In other embodiments, the card may comprise a magnetic strip that stores the KEY information. Various other forms of cards with KEYs are possible.

A consumer may provide the card with the pre-assigned KEY at the time of a purchase and receive promotions and discounts associated with and offered for the KEY. Promotions or discounts given to the consumer, as identified by the KEY, can be redeemed directly at the point of sale as a credit against a purchase. In other embodiments, an account is maintained for each KEY. Instead of instantly receiving discounts or promotions at the point of sale, the value (e.g., cash, points, etc.) associated with the promotions or discounts for the KEY may be deposited into an account associated with the KEY. According to an embodiment of the present invention, the consumer can choose whether to receive an instant redemption at the point of sale or to deposit the value (e.g., cash, points, etc.) associated with the discount or promotion into the account associated with the KEY. Value from various promotions and discounts can be accumulated in the account. Alternatively, the method of redemption may simply be defined by the promotional program and the consumer has no choice as to where the value is deposited.

The accounts associated with KEYs may be maintained by point of sale systems that may be located at retail stores. Depending on the size of the retail operation and the number of stores involved, the accounts may be maintained at a centralized location such as a central or main store computer. In some embodiments, the accounts associated with the KEYs may also be maintained by third party service providers such as entities providing discounts and promotions administering services.

In some embodiments, instead of maintaining separate accounts associated with the KEYs, the consumer using a card with a particular key may specifically identify a bank account or some other financial account (e.g., a bank account of the consumer) where the value associated with the discount or promotion for the KEY is to be deposited. In these embodiments, the consumer has to go through a registration process to associate the financial account where the consumer would like the value deposited with the KEY used by the consumer.

Point of sale (POS) systems also generally maintain a record of consumer transactions that occur at the POS. The transaction information is stored in a transaction log (or "tlog"). The tlog may store information for each transaction that occurred at the POS system. For example, for each transaction, the information stored in the tlog may include information identifying one or more items that were purchased (e.g., UPCs of the purchased items) by a consumer, the prices corresponding to the purchased items, the quantities of the purchased items, discount or promotions if any applied to the purchase, and other information related to the transaction. If the consumer provides KEY information (e.g., provides the card with the KEY at time of checkout) at the time of the purchase, and the POS system supports a mechanism for recording the KEY information in the tlog, then the consumer's purchases can be tied to the KEY. Various different formats may be used for storing the tlog information.

The tlog information may then be analyzed by back-end analytics (e.g., marketing systems) to determine promotions or discounts to be offered for any KEY based upon purchase history associated with the KEY. The promotions or discounts determined from the analysis may be redeemed at the POS or alternatively the value corresponding to the discounts may be deposited in the account associated with the KEY. The value deposited in the account is then available for redemption by the consumer.

As described, by using the KEY (e.g., using a loyalty card with the KEY information), a consumer can accumulate value in a deposit account associated with the KEY. Accordingly, the KEY may also be referred to as an "accumulate ID" and the card (e.g., a loyalty card) that contains the KEY information may be referred to as an "accumulate card".

According to an embodiment of the present invention, a second KEY or unique ID is provided that may be used by a consumer to redeem the value that has already accumulated in an account associated with an accumulate ID. Since the second KEY or unique ID is used for redemptions only, it may be referred to as a "redemption ID" or "financial ID".

As with an accumulate ID, a redemption ID also acts as a limited identification information as it does not convey any private or personal consumer information. Accordingly, a retailer may manufacture several loyalty cards with pre-assigned redemption IDs. These cards may be referred to as "redemption cards". These redemption cards may be made available at the retail store locations or at other locations. A consumer can randomly select a redemption card and start using it without providing any personal information such as name, telephone, number, etc as long as the redemption ID can be associated with an accumulate ID. Redemption cards may come in different shapes and forms. For example, each redemption card may have a redemption ID printed on it. The redemption ID may also be printed on a label that is then affixed to a redemption card. In other embodiments, the redemption ID may be in the form of a barcode that is either printed on or affixed to a redemption card. In other embodiments, a redemption card may comprise a magnetic strip that stores the redemption ID. Various other forms of redemption cards are possible.

As described above, consumers can use an accumulate ID to accumulate value (e.g., cash, points, etc. associated with discounts and promotions) in an account associated with the accumulate ID. According to an embodiment of the present invention, a consumer can then use a redemption ID to redeem value from the account. In order to identify the specific account from which value is to be redeemed, a correlation is established between redemption IDs and accumulate IDs. Once this correlation is established, given a particular redemption ID, the correlation information may be accessed to determine an accumulate ID corresponding to the particular redemption ID, and value may then be redeemed from the account associated with the accumulate ID by using the redemption ID.

Embodiments of the present invention provide various techniques for establishing this correlation between accumulate IDs and redemption IDs. These techniques do not place restrictions on when a consumer can start using an accumulate ID and a redemption ID and further require minimal, if any, changes to the POS systems. A redemption ID may be associated with one or more accumulate IDs.

According to one technique, both the redemption ID and the accumulate ID may be assigned to the consumer at the same time and a correlation established at the time of the assignment. This may be done for example when a consumer registers with a loyalty program and is issued an accumulate card and a redemption card. Information may be stored correlating the accumulate ID on the accumulate card and the redemption ID on the redemption card.

In another embodiment, a consumer may "register" the accumulate and redemption IDs used by the consumer. These IDs may be from cards randomly picked up by the consumer. This can be done by filling out a form identifying both the accumulate ID and the redemption ID used by the consumer. A retailer or loyalty program administrator may offer registration services at the provider's website, in in-store locations, and the like.

As described above, most POS systems maintain a record of transactions that occur at the POS in a tlog. When a consumer provides accumulate ID information at the time of the transaction, the accumulate ID information is included in the tlog and associated with the recorded transaction. According to an embodiment of the present invention, when a consumer provides a redemption ID during checkout, the redemption ID is also recorded in the tlog. In this embodiment, when a consumer provides both an accumulate ID and a redemption ID (e.g., provides both the accumulate card and the redemption card at the time of checkout) to the POS system, both the accumulate ID and the redemption ID are then recorded in the tlog generated by the POS for the transaction. The tlog information identifying both the accumulate ID and the redemption ID for the transaction may then be used to form a correlation between the two IDs. A small value such as $0 or $0.1 may be associated with the redemption card as an initial balance such that the consumer can scan the newly-issued redemption card and the accumulate card in the same transaction and the information is recorded in the tlog. Since the redemption card can be treated as part of the tender (like a gift card or ATM card), the redemption ID will generally be stored with the tender information in the tlog which is separate from the accumulate ID. This provides a simple mechanism for storing the accumulate ID and the redemption ID in the tlog and does not necessitate providing ways for the POS to store multiple accumulate ID's—the existing ability of the POS to store tender information is used instead. This technique allows retailers the flexibility to add redemption card programs to their existing accumulate card loyalty programs with minimal changes to the retailer's existing technology infrastructure for processing loyalty cards. In particular, minimal POS system modifications, if any, are needed as existing POS systems can be used at the same or different retailers.

The correlation information may be stored in a database maintained by the POS system, by a central store computer, or by a third party service provider system (e.g., a marketing service provider).

A consumer may use a redemption ID in various ways. A consumer, using a redemption card, may provide redemption ID information to a POS system. The POS system may be configured to access information correlating redemption IDs to accumulate IDs, determine an accumulate ID corresponding to the redemption ID, and then redeem value from an account associated with the accumulate ID. The redeemed value may be applied towards the consumer purchases. Any remaining amount owed by the consumer can be paid using other means of tender such as cash, a credit/debit card, etc. In certain embodiments, the consumer can specify the amount of value to be redeemed from the account. The consumer-specified amount, if available for redemption, is then redeemed from the account.

A redemption ID may be used completely independent of the accumulate ID. For example, a first consumer (e.g., a mother) may make purchases using a particular accumulate ID to accumulate value in the account associated with the particular accumulate ID. A second consumer (e.g., the daughter of the first consumer) may use a redemption ID that is correlated to the particular accumulate ID to redeem value accumulated in the account associated with the particular accumulate ID. The consumer using the redemption ID need not even have knowledge of the accumulate ID. A redemption ID thus provides a flexible and convenient mechanism for redeeming value that is decoupled from the use of the accumulate ID.

In some embodiments, for security purposes, a password or personal identification information (PIN) may be associated with the redemption ID and the consumer may be required to provide the valid password along with the redemption ID before value from an account can be redeemed. There are various ways in which a password or PIN may be associated with a redemption ID. In one embodiment, POS systems may provide facilities that allow a consumer to associate a password or PIN with the redemption ID. This may be done for example when the consumer picks up a redemption card. In another embodiment, the provider (e.g., the retailer) of redemption IDs (or redemption cards) may provide a website where the consumer can register a password to be associated with a particular redemption ID printed in a redemption card. Other channels such as a 1-800 number, etc. may also be provided for associating PINs with redemption IDs. Passwords or PINs may also be associated with accumulate IDs.

In some embodiments of the present invention, the redemption ID may be determined or derived from the accumulate ID. Various techniques may be used to derive the redemption ID from the accumulate ID. According to one technique, a portion of the accumulate ID may be used as the redemption ID. According to another embodiment, information (e.g., a number) may be added (e.g., prepended, appended) to the accumulate ID to derive the redemption ID. According to yet another embodiment, a function or algorithm may be used that takes as input the accumulate ID and outputs a redemption ID. Various other techniques may also be used. In such embodiments, the consumer is provided with only one ID—the accumulate ID. Systems (e.g., POS systems) processing the accumulate ID are configured to determine or derive the redemption ID.

In other embodiments of the present invention, instead of using a redemption card and an accumulate card, a single card ("universal card") may be provided to the consumer comprising both the accumulate ID and the redemption ID. The redemption ID and the accumulate ID may be embodied on the single card in various ways. In one embodiment, the universal card may comprise two magnetic stripes—one storing redemption ID information and the other storing accumulate ID information. A consumer may use the appropriate magnetic stripe to provide either the redemption ID or accumulate ID. In one embodiment, the magnetic stripe encoding accumulate ID may be attached on one side of the universal card and the magnetic stripe encoding the redemption ID may be attached on the other side of the universal card. In such an embodiment, the two faces of the universal card may have different appearances (e.g., different colors) to distinguish the accumulate ID magnetic stripe from the redemption ID magnetic stripe. The two stripes encoding the IDs may also be located on the same side of the universal card and appropriately marked to identify the IDs they encode. Other techniques such as printing the IDs on the universal card, using labels comprising the IDs, using barcodes, etc. and their combinations may also be used to provide both the accumulate ID and the redemption ID on the universal card.

In some embodiments of the present invention, gift cards that are commonly available at store locations may be used as redemption cards. Gift cards generally have a financial identification number ("FIN") associated with them. For example, the FIN may be encoded in a magnetic stripe attached to the gift card. A consumer generally obtains a gift card and has the card initialized with a dollar amount by submitting tender for the amount of the gift card to a cashier. The cashier then scans the gift card, charges the dollar amount to the consumer, and scans the FIN of the gift card (e.g., may be done by swiping the magnetic stripe of the gift card in a card reader). The dollar amount of the transaction is then credited to the gift card by being relayed back to a financial institution supporting the FIN. The consumer may now give the gift card as a gift or use it himself.

According to an embodiment of the present invention, the FIN associated with a gift card may be used as a redemption ID. Accordingly, when a gift card is used, the FIN may be correlated to an accumulate ID using any of the techniques previously described with respect to correlating redemption IDs with accumulate IDs. One FIN can be correlated to multiple accumulate IDs. The gift card can then be used as a redemption card.

The redemption ID may also be derived from the FIN of a gift card. For example, a portion of the FIN may be used as a redemption ID, information may be added (e.g., appended, pre-pended, etc.) to the FIN to derive the redemption ID. Other techniques may also be used to derive the redemption ID from the FIN. The derived redemption ID may correlated to an accumulate ID. Accordingly, when a consumer uses a gift card, the FIN from the gift card is read, a redemption ID is determined from the FIN, an accumulate ID corresponding to the redemption ID is determined, and value accumulated in the account associated with the accumulate ID may be redeemed. A similar technique can be used to derive a redemption ID from an accumulate ID by appending or pre-pending additional information to the accumulate ID. Note that in this case, only one ID need be stored on the physical card itself.

As described above, a gift card may be used as a redemption card. Using a gift card as a redemption card provides several benefits. The existing gift card infrastructure at a retailer may now be used for redeeming accumulated value without requiring any changes to the infrastructure, especially to the POS systems. A newly-issued gift card is scanned in a transaction in which an existing accumulate ID is used. Once the FIN on the gift card is correlated with the accumulate ID, the gift card can then be used for redemption. Both the accumulate ID card and the gift card may both be issued without direct identification of the consumer.

According to an embodiment of the present invention, a single ID may be used both for accumulating value and for redeeming the accumulated value based upon the context in which the single ID is used. The single ID also acts as limited identification information as it does not convey any private or personal consumer information in and of itself. Different techniques may be used to set the context of use of the card. In this embodiment, the account is associated with the single ID and the context specifies whether value is to be accumulated to the account or redeemed from the account.

According to one technique, two PINs may be associated with the single ID—one PIN for using the single ID for accumulation (the "accumulate PIN") and the other PIN for redemption ("redemption PIN"). In this embodiment, the consumer may provide the single ID and then based upon the PIN entered by the consumer, accumulation or redemption operations are performed. Accordingly, the PIN entered by the consumer specifies the context of use of the card, i.e., determines whether the single ID is to be used as an accumulate ID or a redemption ID. The accumulate PIN can be a well-known PIN since its use results in deposit of value to an account associated with the single ID. Since the redemption PIN can be used to redeem value, it can be a secure special PIN that can be used to redeem the accumulated value in a secure manner. In one embodiment, the secure PIN may be set by the consumer. For example, the retailer may provide a website where the consumer can set a secure PIN that is to be used for redemption purposes. The retailer may also provide a registration number (e.g., a 1-800 number) that a consumer may call to set up the secure PIN.

The single ID may be embodied on a card ("single ID card" or "universal card") that can be used at different POS systems. Multiple such cards may be issued by a retailer for use by consumers. The accumulate PIN may be provided with the card. The consumer can set the redemption PIN using one or more of the previously described techniques. Support for the single ID card may be provided using existing POS infrastructure. Information indicating whether the card is used for accumulation or for redemption may be recorded in the tlog maintained by the POS system. The tlog information may be used for subsequent analysis to determine discount or promotions to be offered to the consumer. A single card can be used at many different retailers since minimal, if any, POS modifications are required. The single card can be offered by retailers using physical ATM card readers and also by virtual or Internet based retailers. Some POS systems may be modified to provide support for the use of the two PINs for a single ID.

According to an embodiment of the present invention, multiple operations may be performed using the single ID, the specific operation to be performed being determined based upon the PIN entered by the consumer. Accordingly, a universal card may be provided having multiple PINs associated with it—each PIN identifying an operation that can be performed using the universal card. Examples of operations that can be performed using the same universal card include debiting an account, crediting an account, withdrawing money from a first account, withdrawing money from a second account, and the like. The PIN entered by the user may be used to determine a specific account and the operation to be performed. For example, a consumer may use the same card as an American Express credit card, VISA credit card, MasterCard, bank ATM card, loyalty card, etc., based upon the PIN entered by the consumer. Each PIN may identify the specific use of the card.

According to another technique, the context of use of a single ID may be based upon actions performed by the checker at the POS system. For example, after the consumer provides the single ID to the checker (e.g., the consumer swipes a single ID card at a checkout ATM card reader), the checker may make a special gesture at the checkout terminal to indicate whether the single ID is to be used for accumulation or for redemption. The special gesture may be in the form of a special code or key sequence entered by the checker (e.g., a first entry to indicate an accumulation operation and a second entry to indicate a redemption operation), a special key pressed by the checker (e.g., a first button to indicate an accumulation operation and a second key to indicate a redemption operation), and the like. The special gestures made by the checker thus specify the context of use of the single ID card, i.e., whether the single ID is to be used as a accumulate ID or a redemption ID.

Several existing POS systems provide input devices that could be used to specify the context of use of the single ID. Accordingly, support for use of the single ID can be provided with minimal, if any, changes to existing POS systems. Information indicating whether the card is used for accumulation or for redemption may also be recorded in the tlog maintained by the POS system. The tlog information may be used for subsequent analysis to determine discount or promotions to be offered to the consumer.

FIG. 1 is a simplified block diagram of a distributed network 100 that may incorporate an embodiment of the present invention. As depicted in FIG. 1, multiple systems are coupled to a communication network 102. These systems include one or more point-of-sale (POS) systems 104, a central store system 106, one or more financial institution computer (FIC) systems 110, and a discount/promotion administration system (DAS) 108. Distributed network 100 depicted in FIG. 1 is merely illustrative of an embodiment incorporating the present invention and does not limit the scope of the invention as recited in the claims. One of ordinary skill in the art would recognize other variations, modifications, and alternatives.

Communication network 102 provides a mechanism allowing the various systems depicted in FIG. 1 to communicate and exchange data and information with each other. Communication network 110 may itself be comprised of many interconnected computer systems and communication links. Communication network 110 may be the Internet, an intranet, a local area network (LAN), a wide area network (WAN), a wireless network, a private network, a public network, a switched network, and the like.

As depicted in FIG. 1, distributed network 100 may comprise one or more point-of-sale (POS) systems 104. A POS system 104 may be implemented in one or more retail stores where a consumer can purchase items, including goods and services. In general, use of the term "item" is intended to refer to any type of good or service that can be purchased. POS systems 104 are widely used in retail stores to process and record purchase transactions that are consummated at the retail store (or stores) where the retail POS system is deployed. Each POS system 104 may store inventory information, pricing information, discounts information, and the like. Each POS system 104 may maintain a transaction log ("tlog") that records transactions that take place at the POS.

According to an embodiment of the present invention, POS systems 104 are configured to support and facilitate the operations of value accumulation and redemption using accumulate IDs and redemption IDs (or single IDs) and store information that is needed for processing accumulate and redemption IDs. In some embodiments, accounts associated with accumulate IDs may be stored at POS systems 104. Information correlating accumulate IDs to redemption IDs may also be stored at POS systems 104 and may be used by POS system 104 to determine the accounts from which to redeem value.

Depending on the size of a retail operation, POS systems 104 located at the individual stores may in turn be coupled to a master or central store computer 106. For example, POS systems 104 located at stores of a large grocery chain may be coupled to a central computer for the grocery chain. POS systems 104 are generally connected to central store computer 106 via a private retail network or an intranet.

Central store computer 106 may provide centralized processing services for the individual stores and provide a central repository for storing inventory information, pricing information, discounts/promotions information, accumulate IDs information, information related to accounts associated with the accumulate IDs, redemption IDs information, information correlating accumulate IDs to redemption IDs, and other types of information. Central store computer 106 may feed inventory and pricing information to the POS systems 104 at the individual stores and act as a clearinghouse for a variety of distribution, inventory, and other information used in the individual store operations.

Individual POS systems 104 may download the tlog information to central store computer 106. In one embodiment, central store computer 106 may analyze the tlog information to determine promotions/discounts to be offered to one or more consumers identified by the accumulate IDs. Central store computer 106 may upload the discount/promotions information to POS systems 104 so that the discount or promotion can be redeemed by consumers at the POS systems. Alternatively, central store computer 106 may deposit the value of the discount or promotion into accounts associated with the accumulate IDs. The value accumulated in the accounts, or a portion thereof, may then be redeemed using redemption IDs that are correlated to the accumulate IDs. In some embodiments, central store computer 106 may be a computer that is managed and run by a third party and located outside of the store's own infrastructure.

According to an embodiment of the present invention, DAS 108 is responsible for computing individual discounts and promotions offered to consumers identified by accumulate IDs. The promotions or discounts may be redeemed at POS systems 104. In other embodiments, DAS 108 may accumulate the values associated with the discounts or promotions in accounts associated with accumulate IDs. DAS 108 may employ a variety of inputs, strategies, and constraints to arrive at the discounts or values to be provided for individual consumers as identified by their accumulate IDs. These include, but are not limited to, the consumer's purchase history, retailer's cost basis and profit requirements, available manufacturer discounts, prospective manufacturer promotions, demographic information, channels used for advertising to the consumer, the consumer's response to the advertising, marketing strategies such as giving greater discounts where consumers exhibit more price awareness, statistical analysis of how consumers have behaved in the past and are likely to behave in the future, specialized loyalty or other incentive programs, and the like.

DAS 108 may access information stored by POS systems 104 and/or by central store computer 106 to determine the value of discounts or promotions to be credited to consumers as identified by accumulate IDs. DAS 108 may communicate the discounts or promotions or value information to POS systems 104 and/or to central store computer 106. In one embodiment, DAS 108 may itself maintain a database of accounts associated with accumulate IDs and accumulate values in these accounts.

Financial institution computer (FIC) systems 110 are configured to process financial transactions to consummate purchases made by consumers in the stores. For example, FIC systems 110 verify and process financial transactions involving credit cards, debit cards, smart cards, and other types of finance cards. In certain embodiments of the present invention, FIC systems 110 may maintain accounts that are used to accumulate value and from which value can be redeemed.

According to an embodiment of the present invention, the various systems depicted in FIG. 1 facilitate accrual of value to consumer accounts associated with accumulate IDs. For example, a consumer may make a purchase at a store and provide accumulate ID information to a POS system 104 located at the store. The accumulate ID identifying the consumer and details related to the consumer's purchase are recorded in the tlog maintained by the POS system 104. The tlog is then analyzed by DAS 108 to determine the discount or promotion to be offered to the consumer. The consumer may receive the discount or promotion at the time of the purchase at the POS. The consumer may also, instead of receiving the discount or promotion at the POS, choose to have the value corresponding to the discount or promotion deposited in a consumer account associated with the consumer's accumulate ID. In this case, the discount value is deposited or added to the consumer account. Alternatively, DAS 108 may directly deposit the value corresponding to the discount or promotion to the consumer account. Consumer accounts may be maintained by POS systems 104, by central store computer 106, or by DAS 108.

The various systems depicted in FIG. 1 are also configured to facilitate redemption of value using redemption IDs. POS systems 104 may be configured to support various techniques described above for correlating redemption IDs to accumulate IDs. As previously described, many of the techniques used for setting the correlation need minimal, if any, changes to existing POS systems. A consumer may go to a store and provide a particular redemption ID assigned to the consumer to POS system 104. Information correlating redemption IDs to accumulate IDs is then accessed and used to determine an accumulate ID corresponding to the redemption ID provided by the consumer. The value accumulated in an account associated with the particular accumulate ID, or a portion of the value, may then be redeemed. The value may be applied to the consumer's current sales total. The value may also be provided to the consumer in the form of coupons, etc. In some embodiments, the consumer may specify the value to be redeemed.

In embodiments where the redemption ID is determined or derived from the accumulate ID, POS systems 104 may be configured to perform the processing for deriving the redemption ID. The redemption ID may then be used for redemption purposes. The processing performed for redemption of value using a redemption ID may also be performed by central store system 106, DAS 108, or by one or more other systems working in conjunction.

Figure 2:
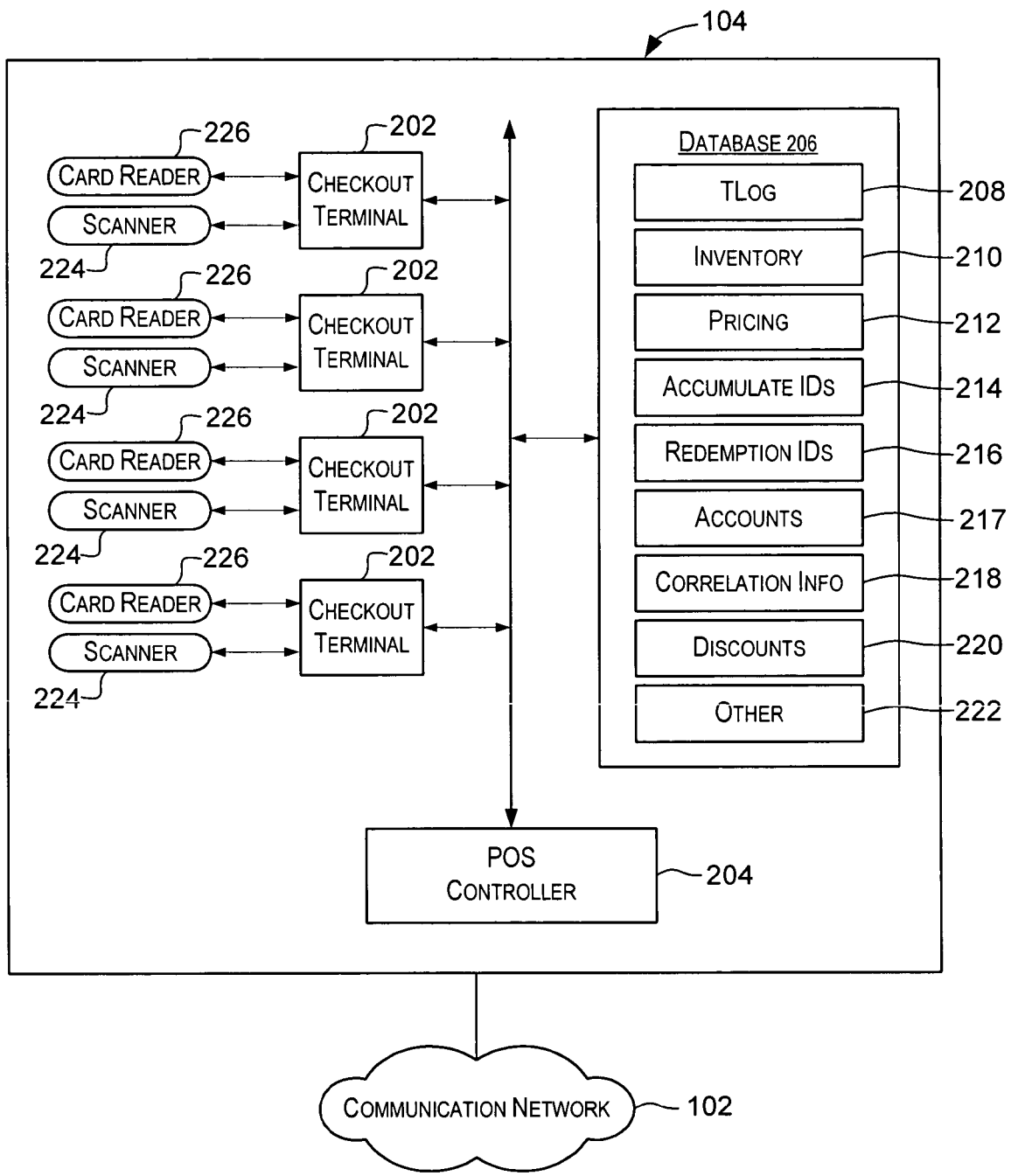
FIG. 2 is a simplified block diagram of a POS system configured according to an embodiment of the present invention.

FIG. 2 is a simplified block diagram of a POS system 104 configured according to an embodiment of the present invention. The complexity of POS system 104 may vary depending on the store and location where the POS system is deployed. Accordingly, the local storage and processing capacity of POS systems 104 may vary in different embodiments. POS system 104 depicted in FIG. 2 is merely illustrative of an embodiment incorporating the present invention and does not limit the scope of the invention as recited in the claims. One of ordinary skill in the art would recognize other variations, modifications, and alternatives.

As shown in FIG. 2, POS system 104 comprises one or more checkout terminals 202, a POS controller 204, and a database 206. Database 206 provides a local repository for storing information that is generated or used by POS system 104. Information stored in database 206 may include tlog information 208, inventory information 210, and pricing information 212. In certain embodiments, the information stored in database 206 may include accumulate IDs information 214, redemption IDs information 216, consumer accounts information 217, information 218 correlating redemption IDs to accumulate IDs, discounts/promotions information 220, and other information 222 used by POS system 104.

In embodiments where POS system 104 is coupled to a central store computer 106, a portion of the information (e.g., pricing information, inventory information, accounts information, information correlating redemption IDs to accumulate IDs) stored in database 206 may be received from central store computer 106. In such embodiments, POS system 104 may communicate information such as tlog information to the central store computer.

Checkout terminals 202 are essentially data processing systems that are configured to record purchase transactions that take place at the retail store. For example, a checkout terminal 202 may be configured to record each item sold, calculate the sales totals, print receipts, and so forth. Checkout terminals 202 may also record the transaction information in a tlog and store the information in database 206.

Checkout terminals 202 are configured to support accumulation and redemption operations using various embodiments of redemption cards, accumulate cards, single ID cards, universal cards, etc. For example, checkout terminals 202 may be configured to receive accumulate IDs information and facilitate accumulation of value to accounts associated with the accumulate IDs. Upon receiving redemption IDs, checkout terminal 202 in conjunction with POS controller 204 may use information 218 correlating redemption IDs to accumulate IDs to determine an accumulate ID corresponding to the redemption ID. Value from a consumer account associated with the accumulate ID may then be redeemed. In certain embodiments, the consumer may specify the amount of value to be redeemed and the specified value is then redeemed from the account.

In certain embodiments, where the redemption ID is determined or derived from the accumulate ID, checkout terminals 202 along with POS controller 204 may be configured to perform operations for deriving the redemption ID. In embodiments where a single ID is used, checkout terminals may provide input devices that can be used to specify the context of use of the single ID. For example, checkout terminal 202 may provide input devices that allow a consumer to enter either an accumulate PIN or a redemption PIN (or any one of multiple PINs associated with a card for various operations that can be performed using the card), or allow a checker to indicate whether the single ID is to be used for accumulation or redemption.

A scanner 224 (e.g., a Universal Product Code (UPC) scanner) and/or an Automated Teller Machine (ATM) card reader 226 may be connected to each checkout terminal 202. Scanner 224 may be used to scan barcodes or UPC codes printed on products. Checkout terminal 202 may use the scanned UPC information to determine the identity of the purchased item, the price of the purchased item, and various other characteristics of the purchased item. This information may be used to calculate sales totals, print receipts, etc.

According to an embodiment of the present invention, scanners 224 are configured to read accumulate ID and/or redemption ID information (or single ID information). As previously described, the accumulate ID and the redemption ID may be embodied as barcodes that are printed (or affixed as labels) on one or more cards. A consumer may provide such a card to a checker at checkout time. The checker can use scanner 224 to scan a barcode corresponding to either the accumulate ID or redemption ID (or single ID). Checkout terminal 202 may cause the scanned ID to be recorded in the tlog.

Card readers 226 are configured to read information encoded in magnetic stripes on cards. For example, card readers 226 are configured to read financial information such as account information from financial cards (e.g., credit cards, debit cards, smart cards, etc.) issued by financial institutions (e.g., banks, credit/debit card companies, etc.). The financial information is then used to consummate purchase transactions. The financial information may be communicated to financial institution computers 110 (depicted in FIG. 1) in order to consummate the financial transaction.

According an embodiment of the present invention, card readers 226 are configured to read accumulate ID and/or redemption ID information (or single ID information) that may be encoded in magnetic stripes on one or more cards (e.g., loyalty cards, universal cards, gift cards, etc.). A consumer may use a card reader 226 to swipe a card having a magnetic stripe encoding either the accumulate ID or redemption ID. The ID information read by card reader 226 is then forwarded to checkout terminal 202 for further processing. Checkout terminal 202 may cause the information to be recorded in the tlog.

As previously described, a password or personal identification number (PIN) may be associated with a redemption ID (or accumulate ID) for security purposes. For such a card, the consumer may enter the password or PIN using input devices (e.g., a keypad) of card reader 226. Card reader 226 may be configured to verify whether the password or PIN is correct and forward the read ID to checkout terminal 202 only upon successful verification. Card reader 226 may also be configured to read and verify the multiple PINs associated with universal or single ID cards and cause appropriate action to be performed.

As described above, card readers 226 are generally configured to communicate the read information to computers of financial institutions for further processing. However, the financial institution need not be involved when only an accumulate or redemption transaction is being done, even when the accumulate ID and the redemption ID are the same. No financial institution transaction (such as a balance inquiry or a debit or credit transaction) need be done. The only processing that may be performed is that the transaction information along with the ID (either accumulate ID or redemption ID) is entered into the tlog, typically in the tender information section of the tlog. Various different techniques may be used to identify the information as a special ID (e.g., redemption ID or accumulate ID) information such as use of a special PIN or gesture, or simply using the card with no PIN. In this situation, the computers of the financial institution need not be consulted. A "short circuit" may be used wherein a computer or switch intercepts the query destined for the financial institution and returns a null transaction type such as "invalid card", "$0 debit", "insufficient balance" or other transaction not affecting the actual tender. When the null transaction is recorded by the POS system it will contain the ID (e.g., redemption ID or accumulate ID) associated with this null transaction; hence the ID information is stored in the tlog for associating purchases to a consumer. Accordingly, embodiments of the present invention use various techniques that prevent the accumulate ID and redemption ID information read by an card reader 226 from being communicated to computers of financial institutions. Examples of such techniques are described in U.S. application Ser. No. 10/778,918 filed concurrently with this application. By using these techniques, support for accumulate IDs and redemption IDs can be provided by existing card readers 226 with minimal or no changes to the card readers.

POS controller 204 is generally a data processing computer system that is configured to perform processing to facilitate operations performed by POS system 104. The processing performed by POS controller 204 may be performed by a single computer system or a plurality of computer systems. According to an embodiment of the present invention, POS controller 204 is configured to facilitate communication of information between POS system 104 and other systems such as other POS systems, central store computers 106, DAS 108, financial institution computers 110, and others. POS controller 204 may communicate with the other systems via communication network 102.

Figure 3:
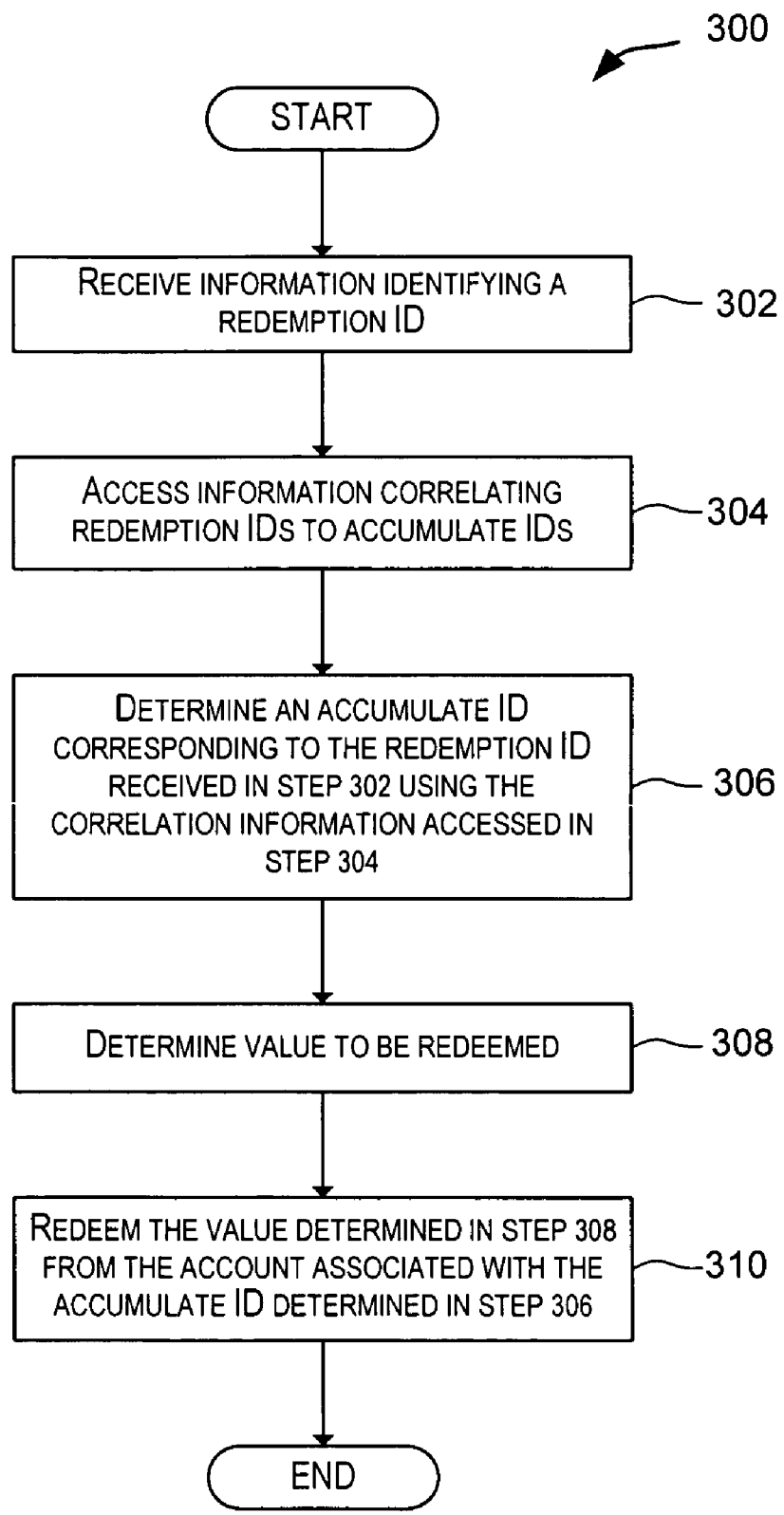
FIG. 3 is a simplified high-level flowchart depicting a method of redeeming value according to an embodiment of the present invention.

FIG. 3 is a simplified high-level flowchart 300 depicting a method of redeeming value according to an embodiment of the present invention. The processing depicted in FIG. 3 may be performed by software modules executed by a processor, hardware modules, or combinations thereof. The processing may be performed by POS systems, central store computers, or DAS, individually or in some combination. Flowchart 300 depicted in FIG. 3 is merely illustrative of an embodiment of the present invention and is not intended to limit the scope of the present invention. Other variations, modifications, and alternatives are also within the scope of the present invention. The method depicted in FIG. 3 may be adapted to work with different implementation constraints.

As depicted in FIG. 3, processing is initiated upon receiving information identifying a redemption ID (step 302). The redemption ID information may be received using various techniques including, but not limited to, scanning a barcode encoding the redemption ID information, reading redemption ID information encoded by a magnetic stripe, receiving redemption ID information entered by the consumer or checker, and the like.

Information correlating redemption IDs to accumulate IDs is then accessed (step 304). This information may be stored in a database. An accumulate ID corresponding to the redemption ID received in step 302 is then determined using the correlation information accessed in step 304 (step 306).

The value to be redeemed is then determined (step 308). In one embodiment, the consumer can specify the value to be determined and information identifying the consumer-specified value may be received along with the redemption ID information in step 302. The value to be redeemed may also be based upon the value accumulated in the account associated with the accumulate ID determined in step 306. The value determined in step 308 is then redeemed from an account associated with the accumulate ID determined instep 306 (step 310). The redeemed value may be applied to a current purchase made by the consumer. The value may also be redeemed in the form of cash, coupons, etc.

Figure 4:
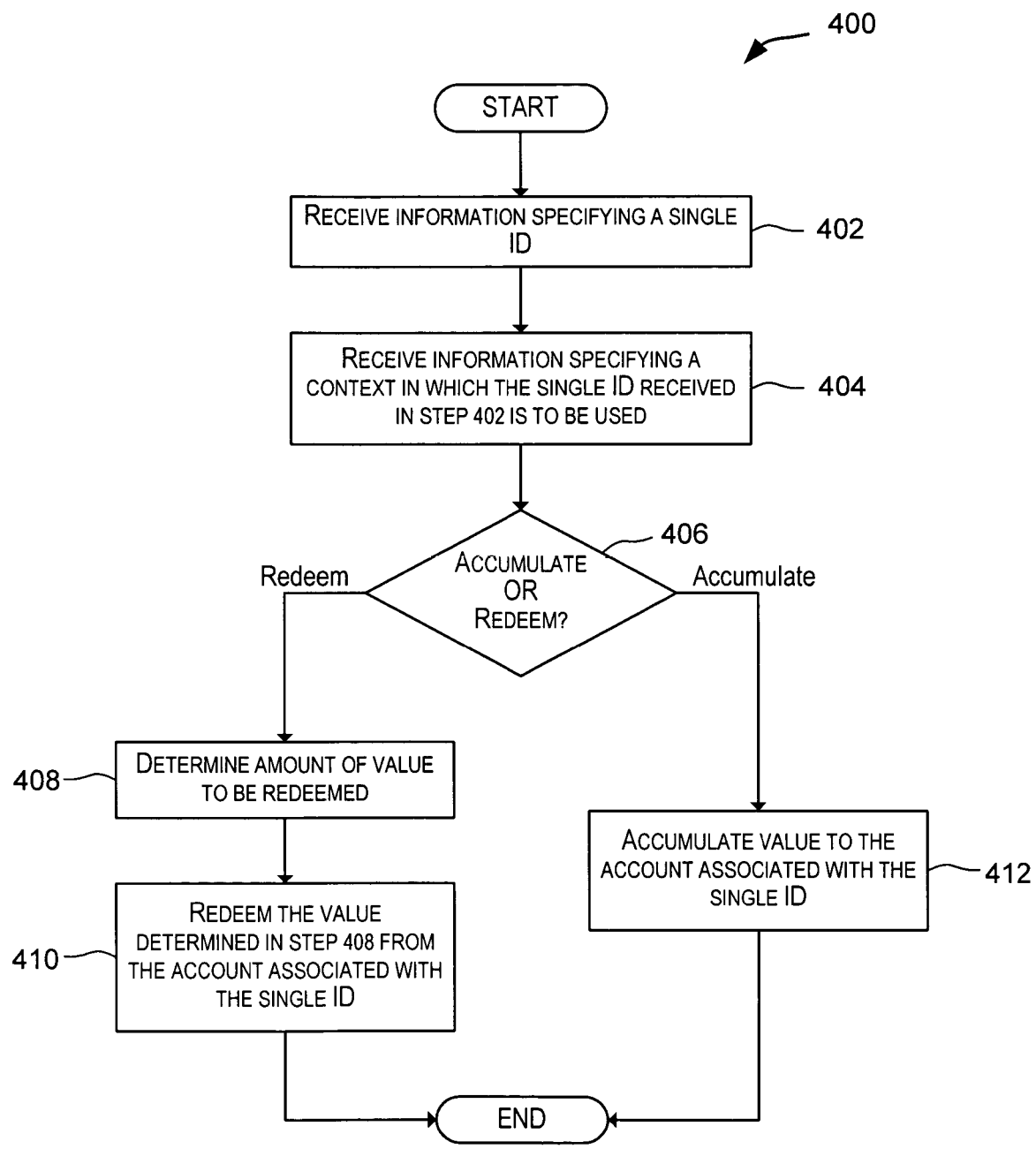
FIG. 4 is a simplified high-level flowchart depicting a method of using a single ID for accumulation or redemption operations according to an embodiment of the present invention.

FIG. 4 is a simplified high-level flowchart 400 depicting a method of using a single ID for accumulation or redemption operations according to an embodiment of the present invention. The processing depicted in FIG. 4 may be performed by software modules executed by a processor, hardware modules, or combinations thereof. The processing may be performed by POS systems, central store computers, or DAS, individually or in some combination. Flowchart 400 depicted in FIG. 4 is merely illustrative of an embodiment of the present invention and is not intended to limit the scope of the present invention. Other variations, modifications, and alternatives are also within the scope of the present invention. The method depicted in FIG. 4 may be adapted to work with different implementation constraints.

As depicted in FIG. 4, processing is initiated upon receiving information specifying a single ID (step 402). Information is received identifying a context in which the single ID received in step 402 is to be used (step 404). As previously described, various different techniques may be used to identify the context in which the single ID is to be used. According to one technique, two PINs may be associated with the single ID—an accumulate PIN for accumulation of value and a redemption PIN for redemption of the accumulated value. In this embodiment, the information received in step 404 may comprise information identifying either a accumulate PIN or a redemption PIN. According to an embodiment of the present invention, if no PIN is provided, it may indicate an accumulation operation. According to another technique, the context of use of the single ID may be based upon actions or gestures performed by the checker at the POS system, e.g., a special code entered by the checker, a special key pressed by the checker, a special key sequence, and the like. The information received in step 404 may identify the action or gesture that is used to determine either an accumulation operation or a redemption operation. Various other types of information received in step 404 may specify the context of use of the single ID.

Based upon the information received in step 404, it is then determined whether an accumulate or redemption operation is to be performed (step 406). If it is determined in step 406 that a redemption operation is to be performed, then the amount of value to be redeemed is determined (step 408). Information specifying the amount to be redeemed may be received as part of step 402 or 404 (e.g., when the consumer specifies the amount to be redeemed). Alternatively, the amount of value to be redeemed may be determined based upon the amount of value that has accumulated in the account associated with the single ID.

The value determined in step 408 is then redeemed from the account associated with the single ID (step 410). The redeemed value may be applied to a current purchase made by the consumer. The value may also be redeemed in the form of cash, coupons, etc.

If it is determined in step 406 that an accumulate operation is to be performed, then value may be deposited to the account associated with the single ID (step 412). The amount of value deposited may be based upon purchases made by the consumer. Information related to the consumer purchases and the single ID may also be written to the tlog for back-end analysis to determine the value to be deposited. The value may be deposited by the POS system, by the central store computer, or by based upon processing performed by a service provider such as DAS 108.

Although not shown in FIG. 4 for reasons of clarity, in certain embodiments of the present invention, both accumulate and redemption operations may be performed upon receiving a single ID. For example, a consumer may specify an amount to be redeemed from value that has already accumulated in an account associated with the single ID. During the same transaction, value may also be deposited into the account associated with the single ID based for example on the current purchases made by the consumer.

The accumulate and redemption operations are merely examples of operations that can be performed using the single ID. According to an embodiment of the present invention, multiple operations may be associated with a single ID and one of the multiple operations may be performed based upon information indicating the context of use of the single ID. Accordingly, a card comprising the single ID may be used to perform multiple operations. Systems or apparatus may be configured to read the single ID information from the card, receive information indicating the context of use, determine an operation to be performed based upon the information indicating the context of use, and then perform or facilitate performance of the determined operation.

For example, according to an embodiment of the present invention, multiple PINs may be associated with a card comprising the single ID, each PIN corresponding to an operation that can be performed using the single ID card. A particular operation may then be performed based upon the PIN entered by the user. Examples of operations include using the same card as an American Express credit card, a VISA credit card, a MasterCard, as a bank ATM card, as a loyalty card, etc.

Figure 5:
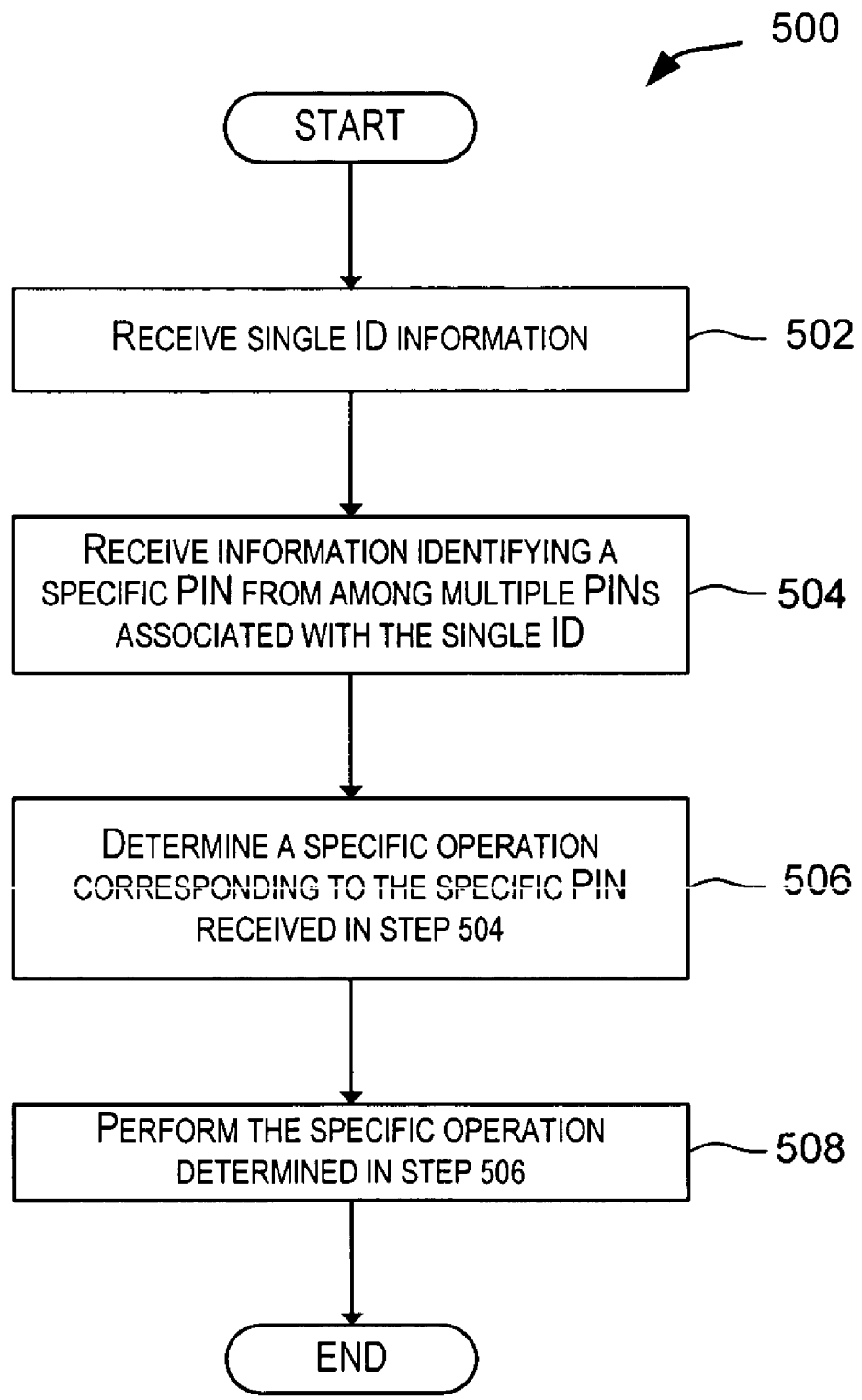
FIG. 5 is a simplified high-level flowchart depicting a method of performing multiple operations using a single ID according to an embodiment of the present invention.

FIG. 5 is a simplified high-level flowchart 500 depicting a method of performing multiple operations using a single ID according to an embodiment of the present invention. The processing depicted in FIG. 5 may be performed by software modules executed by a processor, hardware modules, or combinations thereof. Flowchart 500 depicted in FIG. 5 is merely illustrative of an embodiment of the present invention and is not intended to limit the scope of the present invention. Other variations, modifications, and alternatives are also within the scope of the present invention. The method depicted in FIG. 5 may be adapted to work with different implementation constraints.

As depicted in FIG. 5, processing is initiated upon receiving single ID information (step 502). The single ID information may be read from a card that enables performance of several operations. Several different PINs may be associated with the single ID, each PIN corresponding to an operation to be performed using the card. Information is received identifying a specific PIN from among the several PINs associated with the single ID (step 504). The specific operation corresponding to the specific PIN received in step 504 is then determined (step 506). In one embodiment, information may be stored for each single ID indicating the PINs associated with the single ID and the operations corresponding to the PINs. The PINs may be set by the user of the single ID card The specific operation determined in step 506 is then performed (step 508).

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer network-implemented method of redeeming value accumulated in a consumer account, the method comprising:
   receiving information identifying a first redemption identifier at a store POS terminal of a computer network;
   determining a first accumulate identifier corresponding to, but not the same as, the first redemption identifier through the store POS terminal, the first accumulate identifier used for accumulating, and decoupled from redeeming, value in an account associated with the first accumulate identifier; and
   redeeming a portion of the value accumulated in the account associated with the first accumulate identifier at the store POS terminal.

2. The method of claim 1 wherein determining the first accumulate identifier corresponding to the first redemption identifier comprises:
   accessing correlation information in a database of the computer network identifying a plurality of redemption identifiers and accumulate identifiers corresponding to the redemption identifiers; and
   determining the first accumulate identifier corresponding to the first redemption identifier using the correlation information.

3. The method of claim 1 further comprising:
   receiving information indicating the portion of value to be redeemed at the store POS terminal.

4. The method of claim 1 wherein receiving information identifying the first redemption identifier comprises:
   reading the first redemption identifier from a gift card.

5. The method of claim 4 wherein the gift card is initialized to a first amount, the method further comprising:
   receiving information identifying the first accumulate identifier and the first amount at the store POS terminal; and
   storing information correlating the first redemption identifier and the first accumulate identifier in a database of the computer network through the store POS terminal.

6. The method of claim 1 wherein receiving information identifying the first redemption identifier comprises:
   receiving information read from a gift card, the information identifying a first identifier; and
   determining the first redemption identifier using the first identifier.

7. The method of claim 1 wherein receiving information identifying the first redemption identifier comprises:
   providing a card comprising the first redemption identifier and the first accumulate identifier; and
   reading the first redemption identifier from the card.

8. The method of claim 7 wherein the first redemption identifier is encoded in a first magnetic stripe located on the card and first accumulate identifier is encoded in a second magnetic stripe located on the card.

9. The method of claim 1 wherein the first redemption identifier and the first accumulate identifier are limited information identifiers excluding name information.

10. A method of enabling accumulation and redemption of value in a consumer account, the method comprising:
    receiving information identifying one or more purchases made by a consumer at a first store POS terminal of a computer network;
    receiving an accumulate identifier associated with a consumer account and the one or more purchases at the first store POS terminal;
    receiving a redemption identifier, not identical to the accumulate identifier, associated with the consumer account and the one or more purchases at the first store POS terminal;
    storing the information identifying the one or more purchases, the accumulate identifier, and the redemption identifier in a transaction log for the first store POS terminal;
    analyzing the transaction log to determine information identifying the one or more purchases and the accumulate identifier and the redemption identifier associated with the one or more purchases; and
    storing correlation information correlating the accumulate identifier and the redemption identifier in a database of the computer network.

11. The method of claim 10 further comprising:
    determining a value based upon the one or more purchases at the first store POS terminal; and
    accumulating the value in the consumer account associated with the accumulate identifier.

12. The method of claim 11 further comprising:
    receiving information read from a consumer card at the first store POS terminal or a second store POS terminal of the computer network, the information specifying the redemption identifier;
    determining, using the correlation information, the accumulate identifier corresponding to the redemption identifier; and
    redeeming a portion of the value accumulated in the consumer account associated with the accumulate identifier at the first store POS terminal or the second store POS terminal.

13. The method of claim 10 wherein receiving the redemption identifier comprises reading the redemption identifier from a gift card initialized with a first amount.

14. A computer program product comprising a non-transitory computer-readable medium containing computer executable code that performs the steps of:
    receiving information identifying a first redemption identifier at a store POS terminal;
    determining a first accumulate identifier corresponding, but not identical, to the first redemption identifier through the store POS terminal, the first accumulate identifier used for accumulating, and decoupled from redeeming, value in an account associated with the first accumulate identifier; and
    redeeming a portion of the value accumulated in the account associated with the first accumulate identifier at the store POS terminal.

15. The computer program product of claim 14 wherein the computer executable code for the step of determining the first accumulate identifier corresponding to the first redemption identifier further includes computer executable code for the steps of:
    accessing correlation information identifying a plurality of redemption identifiers and accumulate identifiers corresponding to the redemption identifiers; and
    determining the first accumulate identifier corresponding to the first redemption identifier using the correlation information.

16. The computer program product of claim 14 wherein the computer-readable medium further contains computer executable code that performs the step of:
    receiving information indicating the portion of value to be redeemed.

17. The computer program product of claim 14 wherein the computer executable code for the step of receiving information identifying the first redemption identifier further includes computer executable code for the step of:

reading the first redemption identifier from a gift card.

18. The computer program product of claim 17 wherein the gift card is initialized to a first amount, the computer program product further includes computer executable code for the steps of:

receiving information identifying the first accumulate identifier and the first amount; and storing information correlating the first redemption identifier and the first accumulate identifier.

19. The computer program product of claim 14 wherein the computer executable code for the step of receiving information identifying the first redemption identifier further includes computer executable code for the steps of:

receiving information read from a gift card, the information identifying a first identifier; and determining the first redemption identifier using the first identifier.

20. The computer program product of claim 14 wherein the computer executable code for the step of receiving information identifying the first redemption identifier further includes computer executable code for the step of:

reading the first redemption identifier from a card comprising the first redemption identifier and the first accumulate identifier.

21. The computer program product of claim 20 wherein the first redemption identifier is encoded in a first magnetic stripe located on the card and first accumulate identifier is encoded in a second magnetic stripe located on the card.

22. The computer program product of claim 14 wherein the first redemption identifier and the first accumulate identifier are limited information identifiers excluding name information.

23. A computer program product comprising a non-transitory computer-readable medium containing computer executable code that performs the steps of:

receiving information identifying one or more purchases made by a consumer at a first store POS terminal;

receiving an accumulate identifier associated with the one or more purchases at the first store POS terminal;

receiving a redemption identifier, not identical to the accumulate identifier, associated with the one or more purchases at the first store POS terminal;

storing the information identifying the one or more purchases, the accumulate identifier, and the redemption identifier in a transaction log for the first store POS terminal;

analyzing the transaction log to determine information identifying the one or more purchases and the accumulate identifier and the redemption identifier associated with the one or more purchases; and storing correlation information correlating the accumulate identifier and the redemption identifier.

24. The computer program product of claim 23 wherein the computer-readable medium further contains computer executable code that performs the steps of:

determining a value based upon the one or more purchases at the first store POS terminal; and accumulating the value in an account associated with the accumulate identifier.

25. The computer program product of claim 24 wherein the computer-readable medium further contains computer executable code that performs the steps of:

receiving information read from a card at the first store POS terminal or a second store POS terminal, the information specifying the redemption identifier;

determining, using the correlation information, the accumulate identifier corresponding to the redemption identifier; and redeeming a portion of the value accumulated in the account associated with the accumulate identifier at the first store POS terminal or the second store POS terminal.

26. The computer program product of claim 23 wherein the computer executable code for the step of receiving the redemption identifier comprises computer executable code for the step of reading the redemption identifier from a gift card initialized with a first amount.

* * * * *